Patented Oct. 5, 1943

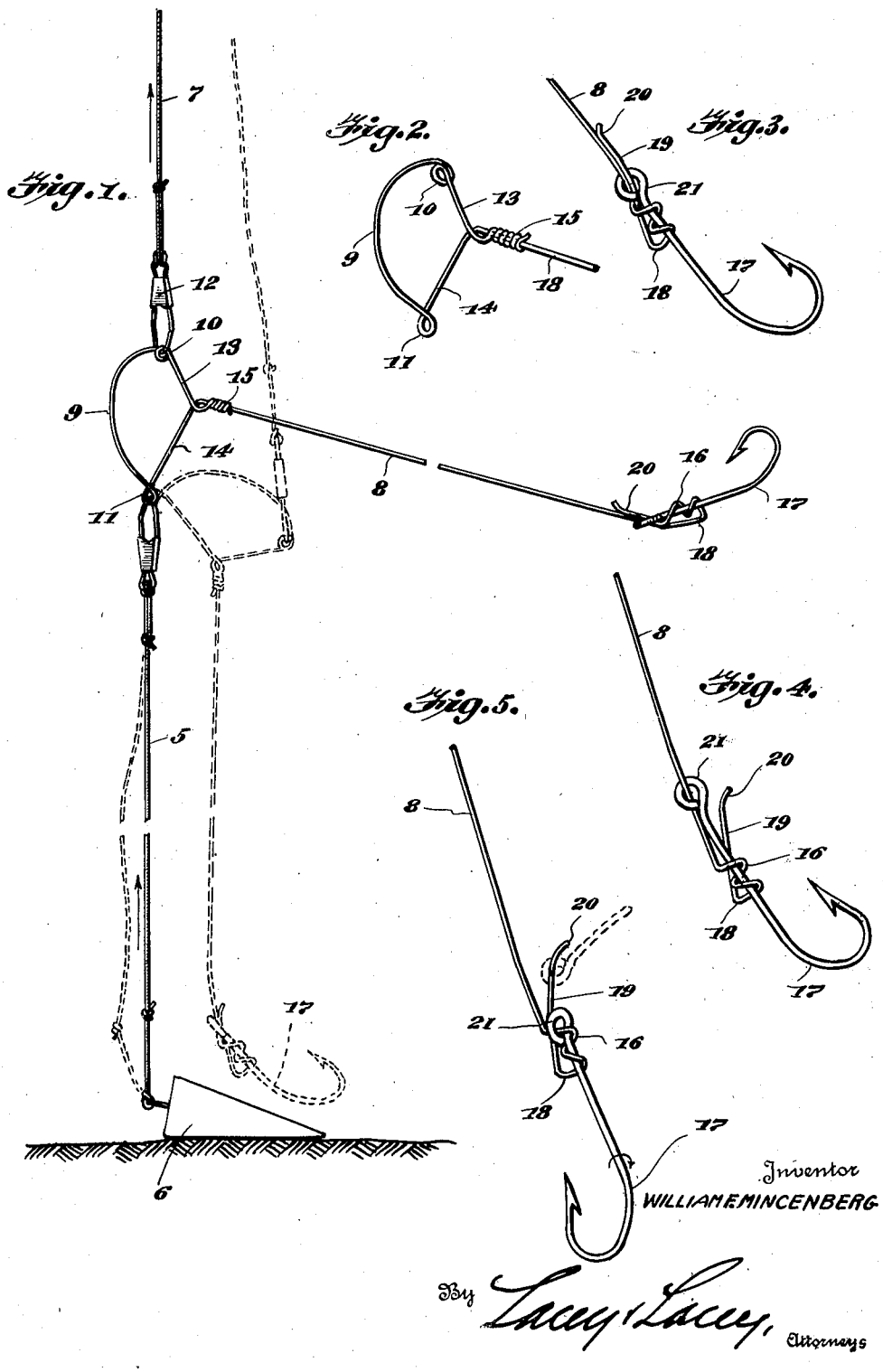

2,331,215

UNITED STATES PATENT OFFICE 2,331,215

LEADER FOR FISHING LINES

William F. Mincenberg, New Brunswick, N. J.

Application January 13, 1943, Serial No. 472,249

4 Claims. (Cl. 43—27)

This invention relates to fishing tackle and more particularly to a novel form of leader for attachment to the fishing line of said tackle.

The object of the invention is to provide a leader of simple and inexpensive construction which will support a hook on a fishing line in spaced relation thereto so as to prevent either the leader or hook from becoming entangled with the line when making a casting or while fishing.

A further object of the invention is to provide a leader, the construction of which is such that after making a casting the leader may be moved to elevated or operative position by exerting an upward pull on the fishing line.

A further object is to provide a metallic leader, one end of which is formed with a spring loop for attachment to the adjacent portions of a fishing line and the other end thereof provided with means for detachable engagement with a hook, the resiliency of the loop serving to relieve tension on the fishing line in case of a backlash and thus prevent breakage of the line.

A further object is to form the leader loop with oppositely disposed attaching eyes, one of which forms a fulcrum for said loop when an upward pull is exerted on the other eye in the act of moving the leader to operative position.

A further object is to form the outer or free end of the leader with a plurality of spring coils or convolutions for detachable engagement with the shank of a fishing hook, the terminal of the leader being provided with a locking finger adapted to extend through the eye of the shank for detachably locking the hook in position on the leader.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a side elevation of a fishing line provided with a metallic hook supporting leader embodying the present invention, the leader being shown in dotted lines in lowered or inoperative position and in full lines in elevated or operative position, Figure 2 is an enlarged detailed perspective view of the loop portion of the leader, Figure 3 is a perspective view of the hook and adjacent portion of the leader showing how said hook is detachably locked in position thereon, Figure 4 is a perspective view showing the shank of the hook moved longitudinally of the leader so as to release the locking terminal from engagement with the eye in the shank of the hook, and Figure 5 is a similar view showing how the hook is rotated on the coils or convolutions of the leader to release said hook and showing in dotted lines how the eye of the shank of the hook is slid off the locking terminal of the leader to effect release of the hook therefrom.

The improved hook supporting leader forming the subject-matter of the present invention is shown in connection with a fishing line of standard construction, in which 5 designates a lower flexible section provided with the usual sinker 6, and 7 the line proper leading to the reel of a fishing pole or to the hand of the operator in case the leader is attached to a hand line. The leader is preferably constructed of a single length of spring metal, such as piano wire, so as to prevent severance thereof by voracious fish and thus obviate the necessity of constantly replacing the leader.

The leader comprises a straight longitudinally disposed body portion 8 of any desired length and, as previously stated, is preferably formed of piano wire. One end of the wire is bent to form a vertically disposed substantially elliptical shaped spring loop 9 having oppositely disposed eyes 10 and 11 integral therewith which detachably engage snap hooks 12 so as to permit the leader to be conveniently attached to or removed from the fishing line at will. After the loops 10 and 11 are formed, the wire is bent inwardly to form converging arms 13 and 14 of different lengths, the wire constituting the terminal of the arm 13 being coiled around the body portion 8, as indicated at 15, or otherwise secured thereto in any suitable manner.

The wire constituting the outer or free end of the leader is bent to form a plurality of spring coils or convolutions 16 for detachable engagement with a fishing hook 17, the wire, after the last convolution is formed, being bent laterally to form an open loop 18 and thence extended longitudinally to form a locking finger 19, the terminal of which is preferably deflected laterally, as indicated at 20, and adapted to pass through the eye 21 on the shank of the hook for the purpose of detachably locking the hook in position on the leader.

In detaching the hook from the leader, said hook is moved longitudinally of the body portion 8 until the deflected locking finger 19 is disengaged from the eye 21 of the hook, as best shown in Figure 4 of the drawing. By then exerting an outward longitudinal pull on the hook and rotating said hook, the eye 21 will follow the path of the convolutions until said eye engages the loop 18 and in which position the hook may be detached from the leader by passing the eye 21 of the hook over the locking terminal, as indicated in dotted lines in Figure 5 of the drawing. In order to position the hook on the leader, the parts are moved in reverse order, as will be readily understood.

In making a casting, the line is thrown outwardly in the usual manner and when the sinker 6 engages the bed of the stream, the leader and its associated parts will drop downwardly to the dotted line position shown in Figure 1 of the drawing. As said leader is formed of spring wire, danger of said leader and the hook connected therewith becoming entangled in the adjacent portion of the line is reduced to a minimum. When an upward pull is exerted on the fishing line, the leader will be moved to the elevated or operative position shown in full lines in Figure 1 of the drawing and during this upward movement of the leader, the eye 11 will form a fulcrum on which the loop 9 turns during the lifting operation. It will here be noted that the lower eye 11 is disposed on the outside of the loop 9 while the upper eye 10 extends within the loop. It will, furthermore, be noted that, inasmuch as the upper arm 13 of the loop is shorter than the lower arm 14, the inside eye 10 in conjunction with the short arm 13 will provide an increased leverage on the loop when elevating the leader preparatory to fishing. Attention is called to the fact that, inasmuch as the loop 9 is resilient, said loop serves to relieve tension on the fishing line in case of a backlash and thus prevent accidental breakage of the line.

The leader is simple in construction and, as far as I am aware, is the only metal leader in which a hook may be directly and quickly attached to or removed from the leader without the employment of auxiliary fastening devices, such as snells and the like.

It will, of course, be understood that the leaders may be made of different sizes and shapes and constructed of any suitable material without departing from the spirit of the invention.

Having thus described the invention, what is claimed as new is:

1. A leader for fishing lines comprising a longitudinally disposed resilient member having one end thereof bent to form a spring loop having oppositely disposed eyes for attachment to a fishing line and provided with converging portions of different lengths, the terminal of one of which is wrapped around said member, the other end of said member having a plurality of spring convolutions to receive the shank of a hook, one of said convolutions being offset with respect thereto to form an open loop terminating in a locking finger adapted to extend through an eye on the shank of the hook for locking the hook in position on said member.

2. A leader for fishing lines formed of a single length of resilient wire having one end thereof provided with means for attachment to a fishing line and its other end having a plurality of spring convolutions adapted to receive the shank of a fish hook, the wire at one of the convolutions being bent laterally to form an open loop terminating in a locking finger adapted to extend through an eye on said shank for locking the hook in position, said hook being movable longitudinally of the leader to release the locking finger from the eye and permit detachment of said hook.

3. A leader for fishing lines comprising a resilient strand having one end thereof provided with means for attachment to a fishing line and its other end bent to form a plurality of spring convolutions adapted to receive the shank of a fish hook and provided with a terminal locking finger adapted to extend through an eye on said shank, the shank of the hook being rotatable longitudinally within the convolutions in one direction to release the locking finger from said eye and in another direction to permit the locking finger to be inserted through the eye.

4. The combination with a leader having a plurality of resilient convolutions terminating in a locking finger the free end of which is deflected laterally, of a fish hook having a shank extending through said convolutions and provided with an eye through which the deflected end of the finger extends for detachably holding the hook in position on the leader.

WILLIAM F. MINCENBERG.